United States Patent [19]

Chass

[11] 4,345,230
[45] Aug. 17, 1982

[54] MULTIPLE ROTARY VARIABLE DIFFERENTIAL TRANSFORMER ON COMMON SHAFT WITH LEAKAGE FLUX COMPENSATION

[75] Inventor: Jacob Chass, Rego Park, N.Y.

[73] Assignee: Pickering & Company, Inc., Plainview, N.Y.

[21] Appl. No.: 230,337

[22] Filed: Feb. 2, 1981

[51] Int. Cl.³ .............................................. H01F 21/06
[52] U.S. Cl. .................................................. 336/135
[58] Field of Search ............... 336/130, 131, 132, 134, 336/135, 120

[56] References Cited

U.S. PATENT DOCUMENTS 3,398,386 8/1968 Sommerlin ........................ 336/135

*Primary Examiner*—Thomas J. Kozma
*Attorney, Agent, or Firm*—Kane, Dalsimer, Kane, Sullivan & Kurucz

[57] ABSTRACT

A rotary variable differential transformer is provided comprising a pair of RVDT units disposed along a common shaft. A third RVDT is positioned along the shaft between the two units. The third RVDT comprises two pairs of secondary coils each pair being connected in series opposition. One of the coil pairs is connected to the secondary coils of one of the RVDT units and the other pair is connected to the secondary coils of the other RVDT unit. The third RVDT unit does not contain a primary and its secondary coils are excited only by the leakage flux from the other units.

6 Claims, 2 Drawing Figures

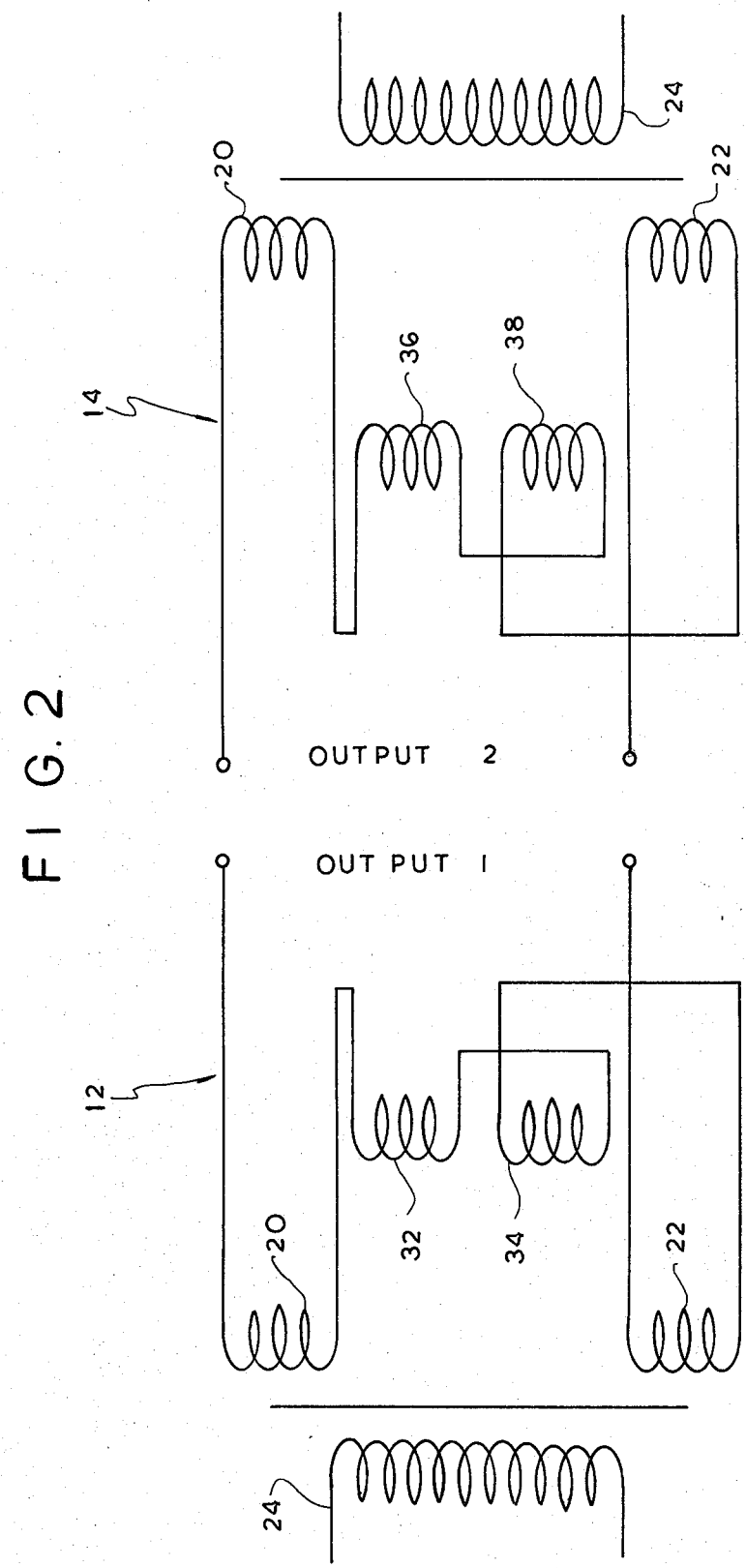

MULTIPLE ROTARY VARIABLE DIFFERENTIAL TRANSFORMER ON COMMON SHAFT WITH LEAKAGE FLUX COMPENSATION

BACKGROUND OF THE INVENTION

The present invention relates to rotary variable differential transformers (RVDT's) and in particular to cross talk compensating RVDT's.

RVDT's are used in control and measurement devices to encode a displacement into an analog electrical signal. In the main, the RVDT's consist of one or more primary and secondary coils as part of the stator assembly, a rotor and a stator. A shift in the position of the rotor relative to the stator produces a change in the magnetic coupling between the primary and secondary windings and thereby causes a change in the output voltage measured across the secondary when an A-C signal is applied to the primary.

One of the major uses for RVDT's is in control and guidance systems (for example, for aircraft). In such applications it is common to provide multiple RVDT's on a common shaft one acting as a backup for the other. In such applications each RVDT is excited at a different frequency. The use of different frequencies for the different RVDT's produces a problem of cross talk between the RVDT's resulting from the leakage flux from one RVDT effecting the output voltage of the other RVDT.

In view of the above, it is the principal object of the present invention to provide an improved multi-unit RVDT in which cross talk between adjacent units is cancelled.

A further object is to provide such an RVDT in which the cancellation is attained without effecting the output of any of the individual units.

Still further objects and advantages will become apparent from the following description of the invention.

SUMMARY OF THE INVENTION

The above and other beneficial objects and advantages are attained in accordance with the present invention by providing a pair of RVDT's units on a common shaft. A first unit comprises a stator having a pair of secondary coils and a primary coil and a rotor secured for rotation to the shaft. A second unit identical with the first unit is spaced from the first unit along the shaft. A third unit interposed between the first and second units contains a first pair of coils connected in series opposition and a second pair of coils connected in series opposition. The third unit first pair of coils are interposed between the first unit secondary coils and the third unit second pair of coils are interposed between the second unit secondary coils.

The secondary coils of the first and second units have the same number of windings. Since the third unit does not have a primary winding, its coils are excited only by the leakage flux from the first and second units and serves to cancel out the voltage induced by the leakage flux.

DETAILED DESCRIPTION OF THE PREFERRED EMBODIMENT

Figure 1:
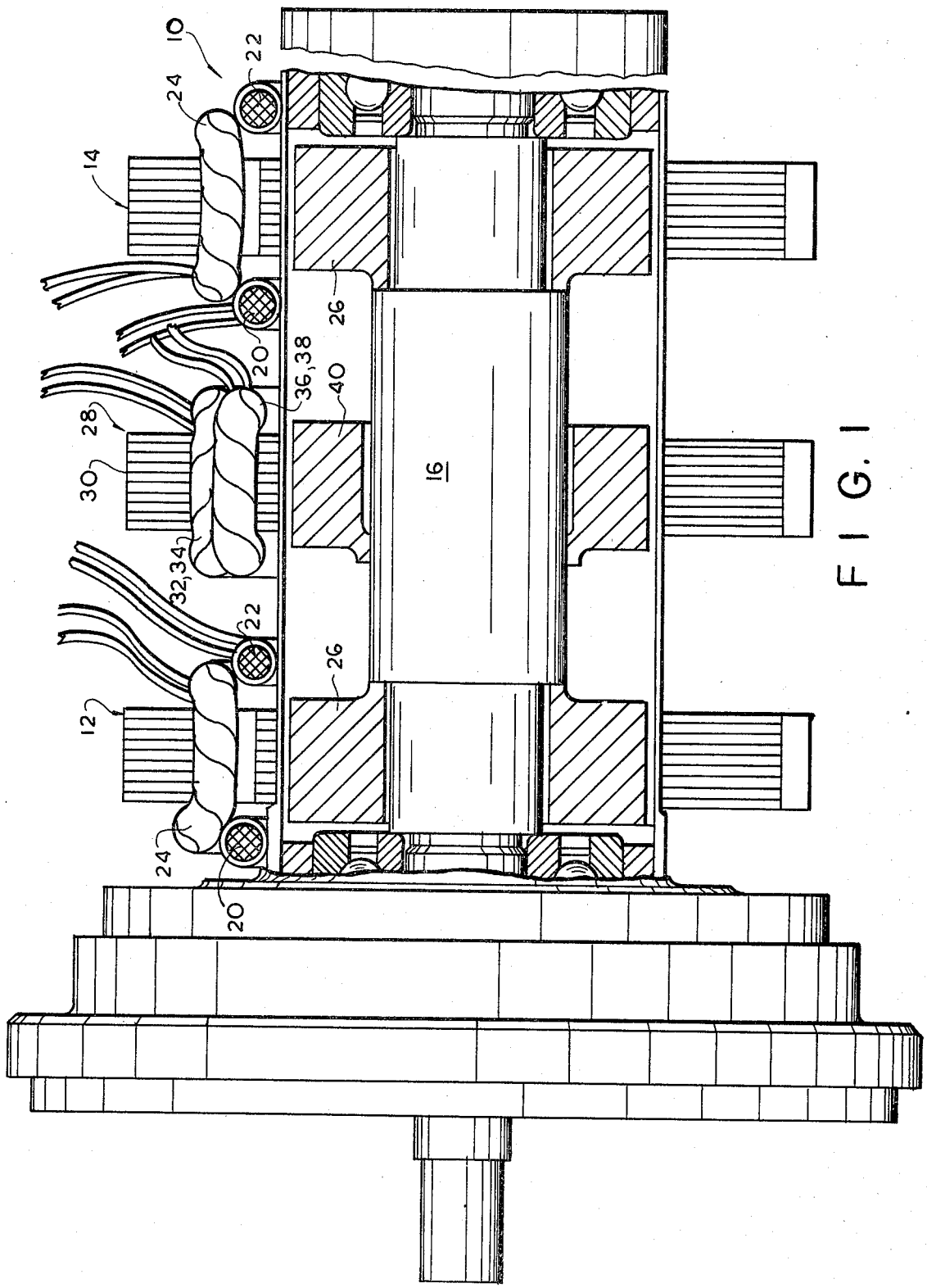
FIG. 1 is a simplified side elevational sectional view of the RVDT of the present invention; and, FIG. 2 is a schematic drawing of the RVDT.

Reference is now made to the drawings and to FIG. 1 in particular wherein the RVDT 10 of the present invention is depicted comprising a pair of identical RVDT units 12 and 14 on a common shaft 16. Each of the RVDT units may, for example, be of the type described in detail in my commonly assigned, copending application Ser. No. 230,338 filed Feb. 2, 1981 for ROTARY VARIABLE DIFFERENTIAL TRANSFORMER WITH SUBSTANTIALLY LINEAR OUTPUT. It suffices for the present description to note that the RVDT units 12 and 14 each comprise a laminated stator along which a pair of identical secondary coils 20 and 22 extend along with a primary coil 24. Magnetic coupling between the primary coil 24 and secondary 20 and 22 is effected through rotor 26 which is secured to shaft 16. The secondary coils 20 and 22 are connected in series opposition.

As stated RVDT unit 14 is identical with unit 12 and is spaced along shaft 16 from unit 12. In practice, the primary coils of units 12 and 14 are excited at different frequencies so that one may serve as a backup for the other.

In accordance with the present invention, in order to prevent leakage flux from unit 12 effecting the output of unit 14 (and vice versa) an additional RVDT unit 28 is positioned on shaft 16 midway between units 12 and 14. Unit 28 comprises a stator 30 along which two pairs of secondary coils 32, 34 and 36, 38 extend and a rotor 40. Unit 28 does not include a primary winding and thus its coils are never independently excited but rather depend on leakage flux from units 12 and 14 for excitation.

The rotors of all three RVDT units are identical and aligned with each other. Similarly the secondary coils of RVDT units 12 and 14 are identical and identically positioned on their respective stators with one pair of coils of RVDT 28. The primary coils of RVDT units 12 and 14 are identical and identically positioned on their respective stators. The other pair of coils of RVDT 28 occupy the position on its stator of the primary coils. As a result, rotation of the shaft results in identical magnetic coupling of the primary and secondary coils of RVDT's 12 and 14 and one pair of coils 32, 34 with the other pair of coils 36, 38 of RVDT 28.

Each of the coils 32, 34, 36, 38 contain the same number of windings and each pair of coils 32, 34 and 36, 38 are connected in series opposition.

As shown in FIG. 2, one pair of coils 32, 34 is connected between secondary coils 20, 22 of unit 12. The other pair of coils 36, 38 are connected between the secondary coils of unit 14. Since coils 32, 34 are excited by the leakage flux of unit 14 and are connected in series opposition they will cancel the induced voltage from unit 14 which would otherwise appear at the output of unit 12. Similarly coils 36, 38 serve to cancel the induced voltage from unit 12 which would otherwise appear at the output of unit 14.

Thus, in accordance with the above, the aforementioned objects are effectively attained.

Having thus described the invention, what is claimed is:

1. A rotary variable differential transformer (RVDT) comprising:

a first RVDT unit having a stator provided with a rotor opening therethrough, at least one primary and one secondary coil wound about portions of said stator, and a rotor extending through said rotor opening for magnetically coupling said primary and secondary coils;

a second RVDT unit having a stator provided with a rotor opening therethrough, at least one primary and one secondary coil wound about portions of said stator, and a rotor extending through said rotor opening for magnetically coupling said primary and secondary coils;

a third RVDT unit interposed between said first and second units having a stator provided with a rotor opening therethrough, a first pair of coils connected in series opposition connected to said first RVDT unit secondary, a second pair of coils connected in series opposition connected to said second RVDT unit secondary, said first and second pairs of coils mounted to said third RVDT unit stator, and a rotor extending through said rotor opening for magnetically coupling said first and second pairs of coils; and, a shaft extending between said first and second RVDT units and having said first, second and third RVDT unit rotors affixed thereto.

2. The invention in accordance with claim 1 wherein said third RVDT is positioned along said shaft equidistant from said first and second RVDT units.

3. The invention in accordance with claims 1 or 2, wherein each of said first and second RVDT unit secondaries comprise a pair of coils connected to each other in series of opposition, said third RVDT first pair of coils are interposed between said first RVDT unit secondary coils and said third RVDT second pair of coils are interposed between said second RVDT unit secondary coils.

4. The invention in accordance with claims 1 or 2 wherein said first, second and third RVDT unit rotors are identical.

5. The invention in accordance with claims 1 or 2 wherein said first, second and third RVDT unit stators are identical.

6. The invention in accordance with claims 1 or 2 wherein each of said first, second and third RVDT unit rotors and stators are identical and identically aligned, said first and second RVDT unit secondary coils and one pair of said third RVDT coils are identically positioned along their respective stators, and said first and second RVDT unit primary coils and the other pair of said third RVDT coils are identically positioned along their respective stators.

* * * * *